(No Model.)
T. S. SPEAKMAN.
APPARATUS FOR UTILIZING THE WASTE PRODUCTS OF COMBUSTION IN FURNACES.
No. 253,780. Patented Feb. 14, 1882.
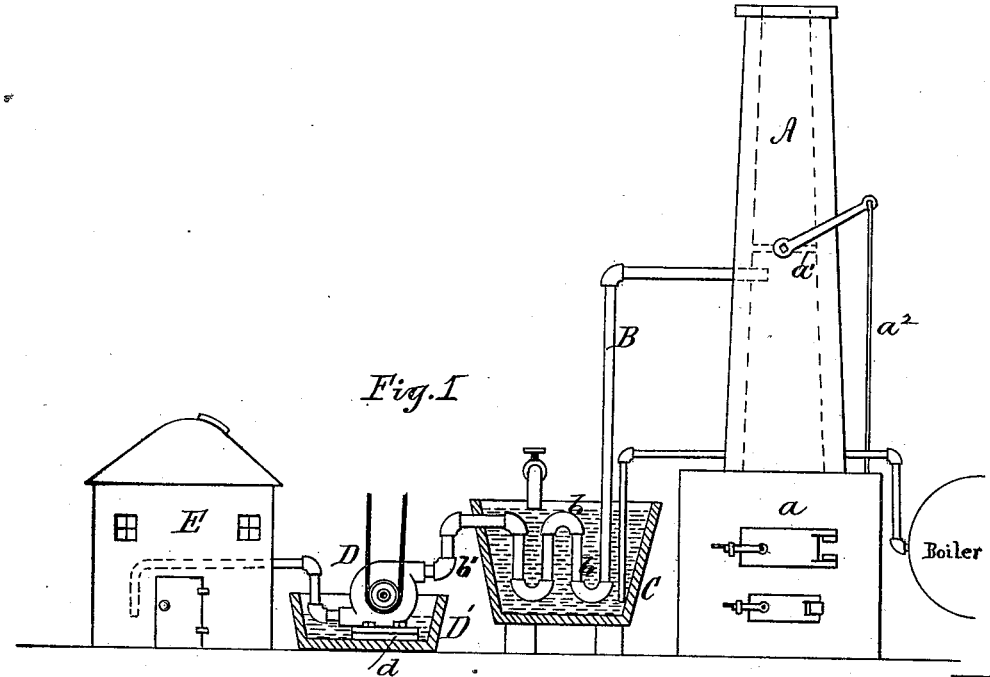
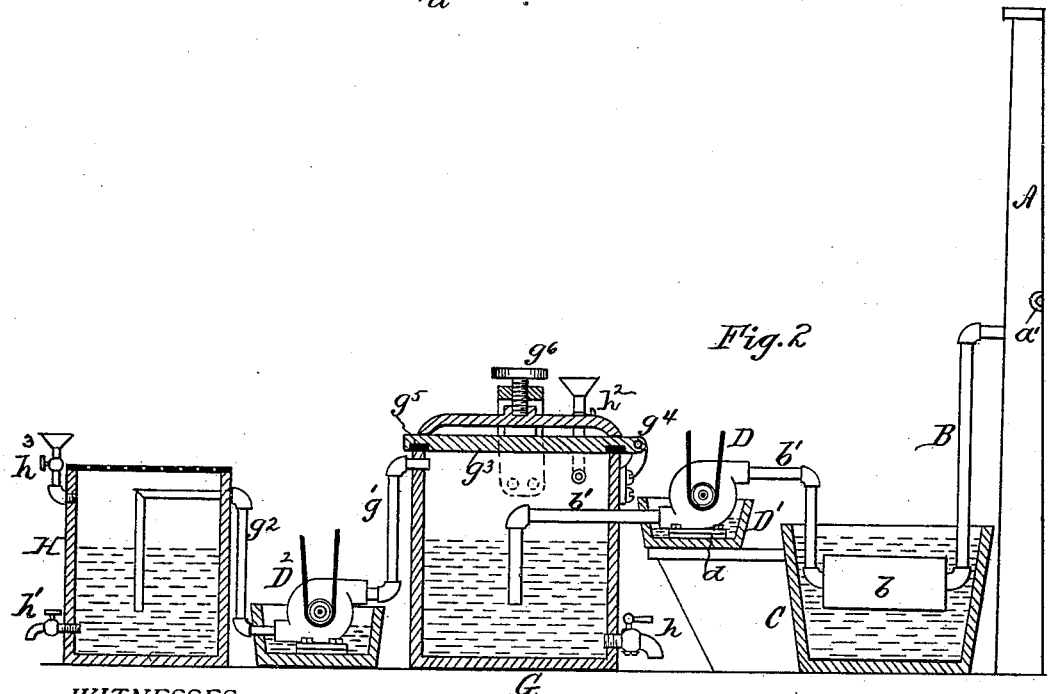
WITNESSES:
Albert Lupton
Chas. Conlin
INVENTOR
Thomas S. Speakman

UNITED STATES PATENT OFFICE.

THOMAS S. SPEAKMAN, OF PHILADELPHIA, PENNSYLVANIA.

APPARATUS FOR UTILIZING THE WASTE PRODUCTS OF COMBUSTION IN FURNACES.

SPECIFICATION forming part of Letters Patent No. 253,780, dated February 14, 1882.

Application filed January 15, 1881. (No model.)

*To all whom it may concern:*

Be it known that I, THOMAS S. SPEAKMAN, a citizen of the United States, residing in the city of Philadelphia, in the county of Philadelphia and State of Pennsylvania, have invented new and useful Improvements in Apparatus for Utilizing the Waste Products of Combustion in Furnaces, of which the following is a specification, reference being had to the accompanying drawings, wherein—

Figures 1 and 2 are sectional views illustrating means for practicing my invention.

My invention has for its object to provide an improved apparatus for utilizing the waste products of combustion in furnaces.

My invention accordingly consists of the novel combination, construction, and arrangement of parts, whereby such waste products of combustion are, as they escape from furnaces, &c., caused to pass into and through a pipe or vessel immersed in water contained in a suitable tank or receptacle to form a condenser, whereby the heated gases of such products of combustion are condensed and part with their caloric, which is radiated through the walls of said pipe or vessel to raise the temperature of said water, the latter being then used as the source of supply for feeding the steam-boilers in the places where my improvements are applied. The said gases, when so condensed, are then by means of a fan or blower, according to their nature, subjected to one, more, or all of the following manipulations: If such waste products of combustion be rich in carbon, after being passed through the condensing apparatus, they are brought to a chamber wherein the carbon or lamp-black is collected and the then nearly pure cool air is allowed to escape into the atmosphere, or instead of conducting said gases into such collecting-chamber they may be sent into a vessel partly filled with a solution of water and quicklime or other alkaline substance. The lamp-black or carbon will then pass up through said solution and collect on its surface, while the remaining products—such as tar, ammonia, &c., unite with or are caught by the alkaline material in said solution and are retained in suspension therein. Such solution and the products of combustion held therein may from time to time be drawn off and evaporated of its water, the resulting solid particles or materials forming a fertilizer. Where such products of combustion are devoid of any great amount of carbon, but are rich in animal matter, after passing through the condensing-chamber they are sent into and held collected in the said chamber partly filled with water and quicklime, wherein they become thoroughly mixed with said alkaline water or held in solution therein, and the resulting mass may from time to time be allowed to escape through proper outlets and dried, as already described, to form a fertilizing material consisting of all the collected products of combustion.

Referring to the accompanying drawings, A represents a chimney or flue attached to a furnace, $a$, and is provided with a damper or valve, $a'$, having an operating cord or chain, $a^2$.

B is a pipe emerging from said chimney below the damper $a'$, and is provided with one, two, or more bends, $b\ b$, which are immersed in water contained in the tank C to form a condensing-chamber.

To the end $b'$ of pipe B is attached a blower, pump, or fan, D, having a pipe-connection with the chamber E. The latter is a lamp-black-collecting chamber, and is made in the usual manner. The fan D is secured to fastenings $d$ in tank D' containing water, so that the lower part of said fan may not be unduly warmed by the hot gases passing therethrough. Said described means are intended to be attached to chimneys, &c., where the products of combustion are rich in carbon or lamp-black—as, for instance, in manufactories, &c., wherein bituminous or soft coal is largely employed as fuel for the furnaces, the smoke from which contains a large percentage of carbon in the form of nearly pure lamp-black. The operation is as follows: The damper $a'$ being closed, so that no smoke can escape from the chimney A, the fan D is started to continue the draft for the furnaces and to cause the products of combustion to pass through the pipe B to the bends $b\ b$ thereof, or the "condenser," as I call this part of the pipe B. As they pass through the same the surrounding water in tank C more or less condenses their heated gases, the caloric of which is radiated through the walls of the condenser and raises the temperature of said water in said tank. The said products of combustion are then drawn into and propelled through fan D and thence into the chamber E, where the lamp-black is deposited on its walls, and which may at suitable intervals be collected, thereby obtaining a product which has heretofore gone to waste, and at a slight expense. At the same time a body of water is heated, which being injected or pumped into the steam-boilers of the establishments wherein my invention is applied, less fuel is required to convert said water into steam in such boilers, thereby effecting an additional saving—viz., in the cost of fuel.

Where the escaping products of combustion contain carbon and also an abundance of animal matter, as in bone-boiling and glue-manufacturing establishments, I employ the means shown in Fig. 2, wherein the end $b'$ of pipe B connects with fan D, and then passes down below the surface of water contained in a tank or vessel, G, and from the latter proceeds a pipe, $g'$, connecting with the fan $D^2$, secured in water, as shown and above described. Said fan exhausts by a pipe, $g^2$, into a vessel, H, partly filled with water and covered with a perforated cover or lid made of wire-gauze. The water in both said tanks is mixed with quicklime or other alkaline material.

$g^3$ is a lid for the vessel G, hinged thereto at $g^4$, and is provided with a gum gasket or packing, $g^5$, whereby when said lid is closed down on said vessel an air-tight joint may be formed by turning the screw $g^6$.

The heated gases of the products of combustion being passed through the condenser, as above described, to heat the water in tank C, they then pass through fan D, and then into the alkaline water in the vessel G. As they emerge from the pipe end $b'$ the carbon or lamp-black rises to and floats on the surface of the water, while the heavy animal matter and the remaining products of combustion either fall to the bottom of vessel G or are held in solution in said alkaline water. The now nearly pure air is drawn into and through fan $D^2$, and thence into vessel H, and any products not yet caught are retained in said vessel in its alkaline solution, while the pure air escapes through its perforated lid. The lamp-black gradually rises in the vessel G until it reaches the lid $g^3$, as may be seen by a glass window provided for that purpose, whereupon said lid is lifted and the lamp-black removed. At intervals the alkaline water and the products held therein in the vessels G and H are drawn off through cocks $h\ h'$ and then evaporated, the solid animal matter and other products of combustion forming a most excellent fertilizer. As said solution is withdrawn from said vessels G and H the latter are replenished with new alkaline water through cocks $h^2\ h^3$. Where the separate collection of the lamp-black is not desired the vessel H is dispensed with and a revolving mixer or stirrer is placed within the vessel G, operated by a belt from the fan-shaft or by other means. The products of combustion are then sent or drawn into said vessel G, and are intimately mixed by the stirrers with the alkaline water in said vessel. A fertilizer is thus obtained in which all the products of combustion are collected.

The last-described means may be also used for collecting metallic vapors passing into the chimneys attached to the furnaces in mints, lead and other such manufactories. In fact all the various and different products of combustion emanating from furnaces used in the different manufacturing-arts may be collected and restored or utilized, as above described. The means for effecting such collection, restoration, and utilization varying but slightly from that shown and described. So, too, my invention may be applied to locomotives, steamboats, and ships of war. In the latter case, the smoke being condensed, they would have no long black "tell-tales" issuing from their smoke-stacks to betray the knowledge of their position to an enemy, or give timely warning to allow the escape of those for whom they are searching.

What I claim as my invention is—

1. The combination of furnace $a$, having flue or chimney A, provided with damper $a'$ and pipe B, the latter terminating in a condenser, $b$, immersed in water contained in a tank, C, the collecting-chambers G H, provided with removable covers, and a fan or blower, D, said parts being arranged for operation substantially as shown and described, and for the purpose set forth.

2. In an apparatus for utilizing the waste products of combustion in furnaces, the combination of the following elements, viz: a furnace provided with a flue or chimney having a damper and a pipe leading therefrom, said pipe terminating in a condenser immersed in water contained in a tank, a collecting chamber or chambers, and pipe-connection between said chambers and condenser, and a fan or blower, said parts being arranged for operation substantially as shown and described.

That I claim the foregoing I have hereunto set my hand this 4th day of January, 1881.

THOMAS S. SPEAKMAN.

Witnesses:
ALBERT LUPTON,
DANIEL LAWS.